(12) United States Patent
Krzos

(10) Patent No.: US 11,496,360 B1
(45) Date of Patent: Nov. 8, 2022

(54) APPLYING IMPAIRMENTS TO NODES OF A DISTRIBUTED COMPUTING ENVIRONMENT USING A SOFTWARE OPERATOR

(71) Applicant: RED HAT, INC., Raleigh, NC (US)

(72) Inventor: Alex Charles Krzos, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/533,640

(22) Filed: Nov. 23, 2021

(51) Int. Cl.
*G06F 15/177* (2006.01)
*H04L 41/0816* (2022.01)
*H04L 67/10* (2022.01)
*H04L 41/0806* (2022.01)

(52) U.S. Cl.
CPC ...... *H04L 41/0816* (2013.01); *H04L 41/0806* (2013.01); *H04L 67/10* (2013.01)

(58) Field of Classification Search
None
See application file for complete search history.

(56) References Cited

U.S. PATENT DOCUMENTS

| | | |
|---|---|---|
| 8,964,553 B2 | 2/2015 | Hutchison et al. |
| 9,088,520 B2 | 7/2015 | Hutchison et al. |
| 9,660,917 B2 | 5/2017 | Mcnaughton et al. |
| 9,843,479 B2 | 12/2017 | Rosa De Sousa Teixeira et al. |
| 10,243,820 B2 | 3/2019 | Richards et al. |
| 10,587,681 B2 * | 3/2020 | Iyengar ................... H04L 41/14 |
| 2011/0191500 A1 * | 8/2011 | Odayappan ........ G05B 19/0426 710/8 |
| 2017/0149875 A1 * | 5/2017 | Iyengar ................... H04L 67/10 |
| 2020/0356433 A1 * | 11/2020 | Kumar ............... G06F 11/0787 |
| 2021/0271522 A1 * | 9/2021 | Butterworth ......... H04L 45/123 |
| 2022/0006694 A1 * | 1/2022 | Hansen .............. H04L 41/0816 |

OTHER PUBLICATIONS

"Using remote worker nodes at the network edge," Red Hat, Inc., OpenShift, downloaded from Internet on Sep. 30, 2021, https://docs.openshift.com/container-platform/4.6/nodes/edge/nodes-edge-remote-workers.html.
"Cluster-Impairment-Operator," GitHub, Inc., 2021, https://github.com/redhat-performance/cluster-impairment-operator.

* cited by examiner

*Primary Examiner* — Quang N Nguyen
(74) *Attorney, Agent, or Firm* — Kilpatrick Townsend & Stockton LLP

(57) ABSTRACT

Impairments can be applied to nodes of a distributed computing environment using a software operator. For example, a system can receive, by a controller of a distributed computing environment executing a network-impairment operator, a custom resource defining a reduced-performance configuration for a worker node of the distributed computing environment. The system can deploy the reduced-performance configuration to the worker node for a predetermined period of time. Subsequent to the predetermined period of time passing, the system can remove the reduced-performance configuration from the worker node.

20 Claims, 4 Drawing Sheets

APPLYING IMPAIRMENTS TO NODES OF A DISTRIBUTED COMPUTING ENVIRONMENT USING A SOFTWARE OPERATOR

TECHNICAL FIELD

The present disclosure relates generally to software operators in distributed computing environments. More specifically, but not by way of limitation, this disclosure relates to applying impairments to nodes of a distributed computing environment using a software operator.

BACKGROUND

To help automate the deployment, scaling, and management of software resources such as applications and microservices, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments.

Kubernetes environments can include software operators ("operators") for automating various repeatable tasks, such as deployment, scaling, and backup of software resources. In the context of Kubernetes, an operator is a software extension that can manage an assigned software resource, such as a stateful application. Once deployed, operators can create, configure, and manage instances of their assigned software resources on behalf of a user in a declarative way.

DETAILED DESCRIPTION

Figure 1:
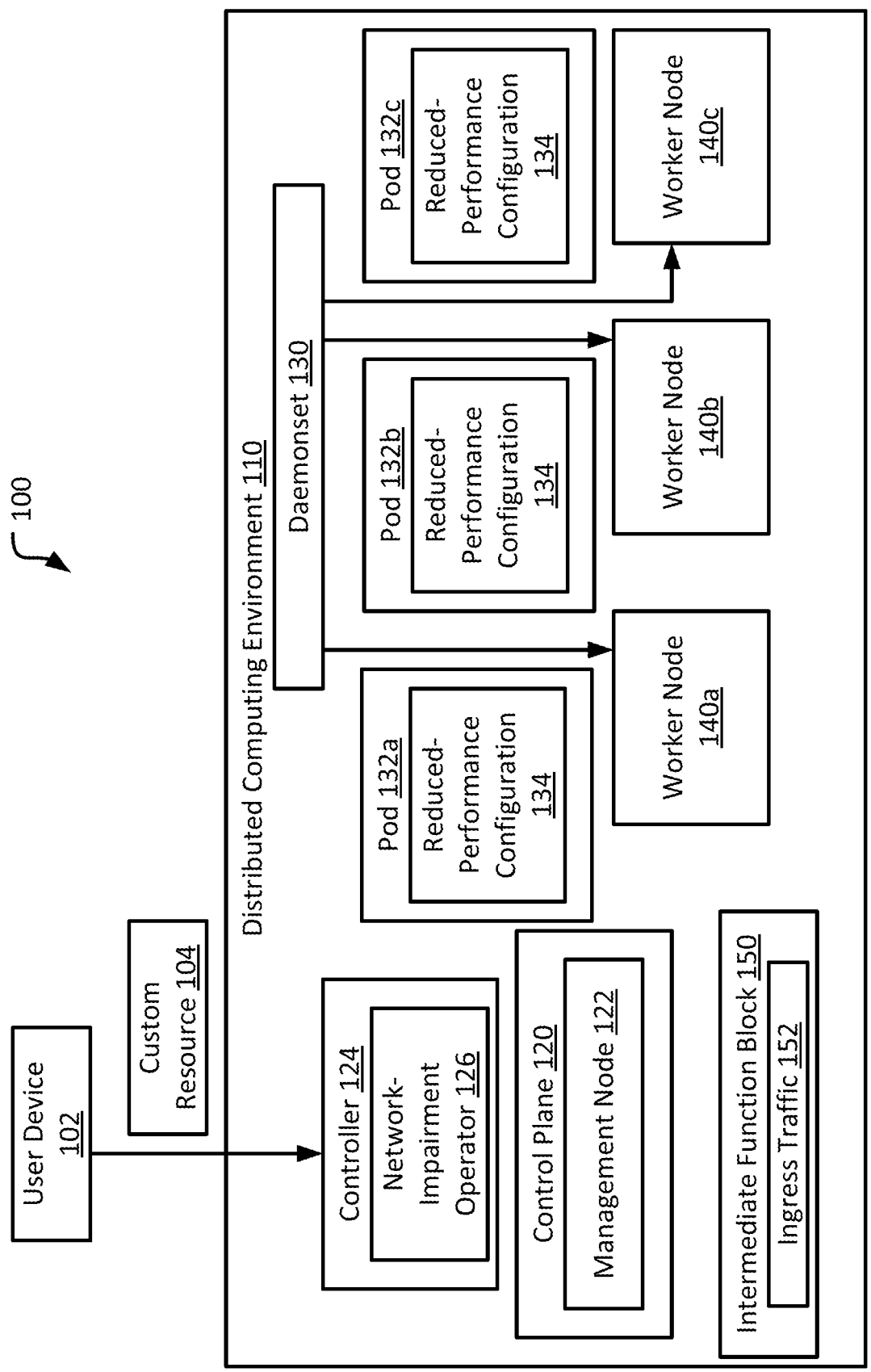
FIG. 1 shows a block diagram of an example of a system for applying impairments to nodes of a distributed computing environment according to some aspects of the present disclosure.

It may be beneficial to simulate remote worker nodes and effects of placing nodes of a distributed computing environment over a wide-area network (WAN) for evaluating a performance of the nodes and the distributed computing environment as a whole. But, typically nodes a user is attempting to test are located in a single server rack, or are virtualized nodes on a same piece of hardware. Therefore, the nodes may not experience network conditions similar to that of being remote from each other or over a WAN. The user can manually apply impairments, but these impairments are limited to that which the user is permitted to configure through command-line operations. The user is typically limited to applying impairments to one node at a time, so simulating multiple remote worker nodes may involve manually performing the same command-line operations multiple times for each of the nodes. Thus, the types of impairments that can be applied to the nodes may be limited and the process of simulating and evaluating multiple remote nodes can be time-intensive for the user.

Some examples of the present disclosure can overcome one or more of the abovementioned problems by providing a system that uses a software operator to apply impairments to nodes of a distributed computing environment. A controller of a distributed computing environment that executes a network-impairment operator can receive a custom resource defining a reduced-performance configuration for a worker node of the distributed computing environment. The reduced-performance configuration can correspond to the impairments that are to be applied to the worker node. For example, the impairments can include network latency, bandwidth, packet loss, link flapping, packet duplication, or packet reordering impairments. The system can deploy the reduced-performance configuration to the worker node for a predetermined period of time. Subsequent to the predetermined period of time passing, the system can remove the reduced-performance configuration from the worker node. In some examples, the custom resource can specify that the reduced-performance configuration is to be applied to multiple worker nodes. As a result, once a user creates the custom resource, impairments can be automatically applied to nodes without additional interaction by the user. The time involved in applying impairments can be reduced and the types of impairments that can be applied to the nodes can be increased.

One particular example can involve a computing cluster that is running Kubernetes as a container orchestration platform. The computing cluster can include a controller executing a network-impairment operation. The controller can receive a custom-resource specifying that five worker nodes of the computing cluster are to be subjected to fifty milliseconds of ingress and egress network latency for sixty seconds. The controller can generate a daemonset that generates pods including a reduced-performance configuration of the fifty milliseconds of ingress and egress network latency. The five worker nodes can then create the respective pod with the reduced-performance configuration. During the sixty seconds, a ping between one of the five worker nodes and a management node of the computing cluster can take one-hundred milliseconds. Additionally, a ping between two of the five worker nodes can take two-hundred milliseconds. An impact of the added network latency can be evaluated by the controller during the sixty seconds. As a result, a user only needs to create the custom resource, and the operator can apply the reduced-performance configuration to multiple nodes at once. This can significantly reduce time involved in testing an impairment of nodes of a computing cluster, as well as expand the impairments that can be applied to the nodes.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for applying impairments to nodes of a distributed computing environment 110 according to some aspects of the present disclosure. The distributed computing environment 110 may be a computing cluster, such as a Kubernetes cluster, formed from multiple nodes (e.g., servers or other computing devices) in communication with one another over one or more networks. FIG. 1 includes a control plane 120 with a management node 122, a controller 124, and worker nodes 140a-c. The controller 124 may execute on a node of the distributed computing environment 110. The control plane 120, the controller 124, and the worker nodes 140a-c may communicate with one another to collectively perform tasks in the distributed computing environment 110. For example, the controller 124, management node 122, and the worker nodes 140a-c can communicate with one another to perform distributed data processing or other distributed projects in the distributed computing environment.

The control plane 120 can be a layer of the computing cluster that exposes an application programming interface (API) and interfaces to define, deploy, and manage containers. For example, the control plane 120 can manage the worker nodes 140a-c by scheduling pods to run on the worker nodes 140a-c. In some examples, multiple management nodes can make up the control plane 120. The management node 122 can include a controller 124 that executes a network-impairment operator 126. Operators can enhance behavior of a computing cluster without modifying the code of the cluster by linking controllers to one or more custom resources. The network-impairment operator 126 can be linked with a custom resource 104.

The custom resource 104 may be a yet another markup language (YAML) file defined by a user that specifies actions the network-impairment operator 126 is to perform. For example, the custom resource 104 can define a reduced-performance configuration 134 that the network-impairment operator 126 is to apply to one or more of the worker nodes 140a-c. The reduced-performance configuration 134 can specify performance statistics, such as network latency specifications, bandwidth specifications, a link flapping specification, a packet loss specification, a packet duplication specification, a packet reordering specification, or a combination thereof, along with an indication of which of the worker nodes 140a-c are to receive the reduced-performance configuration 134. The reduced-performance configuration 134 may be designed to mimic placing one or more of the worker nodes 140a-c over a WAN so that the user can evaluate a performance of the worker nodes 140a-c under such conditions without physically separating the worker nodes 140a-c from each other, the controller 124, or the control plane 120. That is, the worker nodes 140a-c, the controller 124, and the control plane 120 may all be located in a common geographic location, such as in one or more server racks in the same building.

It may be beneficial to test a large number of worker nodes being subjected to the reduced-performance configuration 134 at the same time, so a number of worker nodes specified in the custom resource 104 that are to receive the reduced-performance configuration 134 may be greater than a threshold. For example, the threshold may be two worker nodes, five worker nodes, ten worker nodes, fifty worker nodes, or any other suitable number of worker nodes of the distributed computing environment 110.

The controller 124 can receive the custom resource 104 from a user device 102 subsequent to the user creating the custom resource 104 and causing the custom resource 104 to be sent to the distributed computing environment 110. Along with the reduced-performance configuration 134 and the specification of which of the worker nodes 140a-c are to receive the reduced-performance configuration 134, the custom resource 104 can also specify a predetermined period of time for which the specified worker node(s) are to be subjected to the reduced-performance configuration 134. Specifying the predetermined period of time can ensure that the distributed computing environment 110 is not subjected to sub-optimal conditions indefinitely so that the distributed computing environment 110 is able to recover. The custom resource 104 may specify a start time and an end time for applying the reduced-performance configuration 134 to the worker nodes 140a-c, or the custom resource 104 may specify a duration for applying the custom resource 104 to the worker nodes 140a-c.

The controller 124 can deploy the reduced-performance configuration 134 to the specified worker nodes for the predetermined period of time. For example, the custom resource 104 can indicate that each of the worker nodes 140a-c is to receive the reduced-performance configuration 134 for five minutes, so the controller 124 can deploy the reduced-performance configuration 134 to the worker nodes 140a-c for five minutes. To deploy the reduced-performance configuration 134 to the worker nodes 140a-c, the network-impairment operator 126 can generate a daemonset 130, which ensures that a copy of a pod runs across the specified worker nodes in the distributed computing environment 110. The daemonset 130 can generate pods 132a-c that include the reduced-performance configuration 134 and send the pods 132a-c to the worker nodes 140a-c. As illustrated in FIG. 1, the pod 132a can be run on the worker node 140a, the pod 132b can be run on the worker node 140b, and the pod 132c can be run on the worker node 140c.

Each of the worker nodes 140a-c can include a network interface card (NIC) that applies egress components of the reduced-performance configuration 134 to the worker nodes 140a-c. Egress components can affect traffic going to the worker nodes 140a-c. For example, the reduced-performance configuration 134 can apply an egress network latency specification, an egress bandwidth specification, an egress packet loss specification, or a combination thereof for the worker nodes 140a-c. As one particular example, the reduced-performance configuration 134 can apply one-hundred milliseconds of egress network latency and one-thousand kilobits-per-second of egress bandwidth for traffic going to the worker nodes 140a-c.

Ingress components of the reduced-performance configuration 134 can be applied by an intermediate function block 150 of the distributed computing environment 110. Ingress components can affect traffic coming from the worker nodes 140a-c. For example, the reduced-performance configuration 134 can apply an ingress network latency specification, an ingress bandwidth specification, an ingress packet loss specification, or a combination thereof for the worker nodes 140a-c. As one particular example, the reduced-performance configuration 134 can apply ten milliseconds of ingress network latency and 5% of ingress packet loss for traffic coming from the worker nodes 140a-c. Ingress traffic 152 from the worker nodes 140a-c can be routed to the intermediate function block 150 that then can apply the ingress components of the reduced-performance configuration 134 to the ingress traffic 152.

Figure 2:
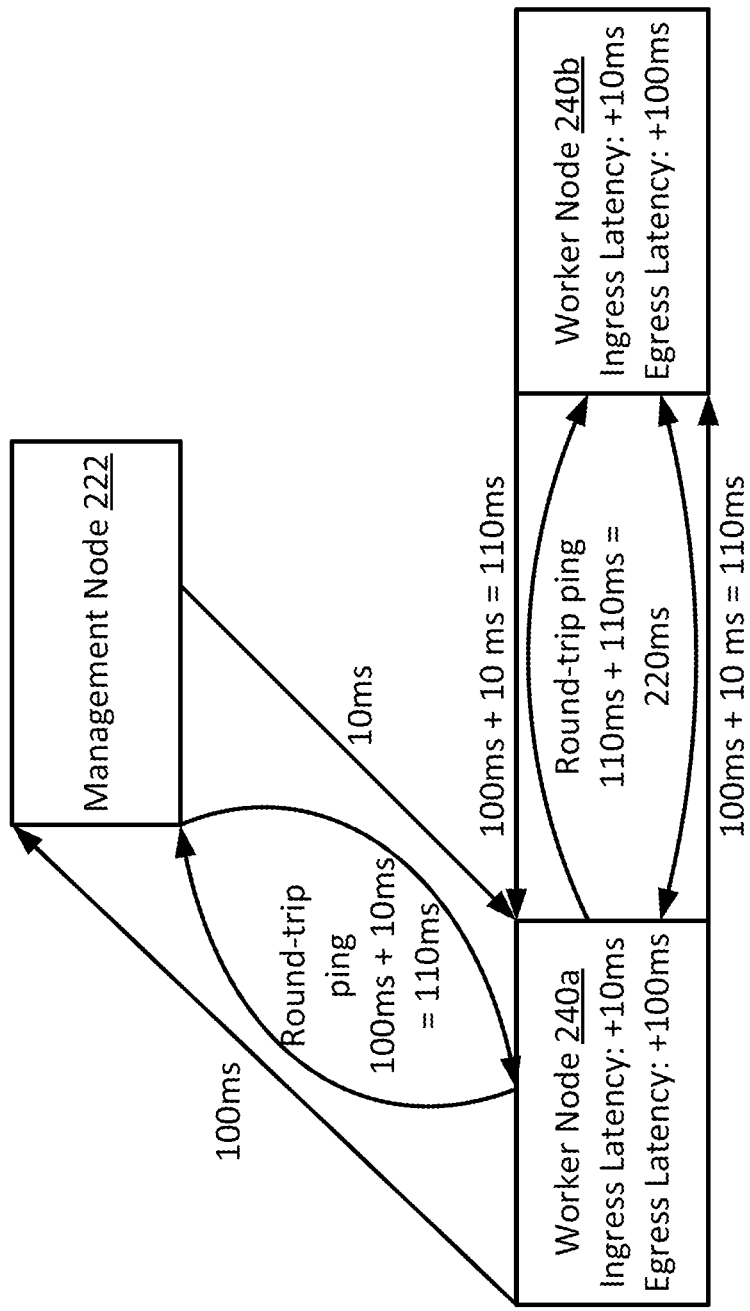
FIG. 2 illustrates a block diagram of an example of applying network latency of a reduced-performance configuration to worker nodes of a distributed computing environment according to some aspects of the present disclosure.

FIG. 2 illustrates a block diagram of an example of applying network latency of a reduced-performance configuration to worker nodes 240a-b of a distributed computing environment according to some aspects of the present disclosure. The ingress latency for the worker nodes 240a-b is ten milliseconds and the egress latency for the worker nodes 240a-b is one-hundred milliseconds. A management node 222 in communication with the worker nodes 240a-b is not subjected to impairments of the reduced-performance configuration.

Based on the reduced-performance configuration, traffic going from the worker node 240a to the management node 222 takes one-hundred milliseconds and traffic going from the management node 222 to the worker node 240a takes ten milliseconds. A round-trip ping between the worker node 240a and the management node 222 takes one-hundred ten milliseconds, since the ping is subjected to the ten milliseconds of ingress latency and the one-hundred milliseconds of egress latency.

Additionally, traffic going from the worker node 240a to the worker node 240b takes one-hundred ten milliseconds and traffic going from the worker node 240b to the worker node 240a takes one-hundred ten milliseconds, since the traffic going either way is subjected to the ten milliseconds of ingress latency and the one-hundred milliseconds of egress latency. A round-trip ping between the worker node 240a and the worker node 240b takes two-hundred twenty milliseconds, since the ping is subjected to the ten milliseconds of ingress latency and the one-hundred milliseconds of egress latency at each of the worker nodes 240a-b.

While the reduced-performance configuration 134 is applied to one or more of the worker nodes 140a-c, the controller 124 can evaluate a performance of the one or more worker nodes 140a-c. The controller 124 may evaluate whether an eviction policy for a pod on a worker node experiencing the reduced-performance configuration 134 is executed, how taints and tolerations are applied to the worker node experiencing the reduced-performance configuration 134, or a scalability of having a number of worker nodes subjected to the reduced-performance configuration 134. The evaluation may additionally involve determining that a worker node becomes "NotReady", which may result in the pod on the worker node being evicted and rescheduled to another worker node. The evaluation can allow the controller 124 to determine how configurations of the worker nodes 140a-c can be adjusted for better performance in the distributed computing environment 110. For example, if the reduced-performance configuration 134 is applied to the worker node 140a, the controller 124 may determine that the worker node 140a is evicted during the predetermined period of time. The controller 124 can then determine or indicate to the user device 102 that worker nodes of the distributed computing environment 110, or a similar distributed computing environment, should not have a configuration similar to the reduced-performance configuration 134 because the worker nodes may be evicted.

In some examples, the controller 124 can configure the daemonset 130 to automatically remove the pods 132a-c from the worker nodes 140a-c subsequent to the predetermined period of time passing so that the distributed computing environment 110 can recover from the reduced-performance configuration 134. In addition, the controller 124 may generate the daemonset 130 to deploy the reduced-performance configuration 134 to the worker nodes 140a-c for a first predetermined period of time and to deploy another reduced-performance configuration to some or all of the worker nodes 140a-c for a second predetermined period of time subsequent to the first predetermined period of time. To do this, the start time for the other reduced-performance configuration can be subsequent, such as a few seconds after, the end time for the initial reduced-performance configuration. The daemonset 130 can remove the reduced-performance configuration 134 from the worker nodes 140a-c prior to applying the other reduced-performance configuration.

While the example shown in FIG. 1 has a certain number and arrangement of components, these are merely illustrative. Other examples can include more components, fewer components, or a different arrangement of the components shown in FIG. 1. For instance, while the example of FIG. 1 includes three worker nodes, other examples can include a smaller or larger number of worker nodes that can be subjected to a reduced-performance configuration. Additionally, although only the worker nodes in FIG. 1 are described as receiving the reduced-performance configuration, management nodes of the control plane may additionally or alternatively receive a reduced-performance configuration in other examples.

Figure 3:
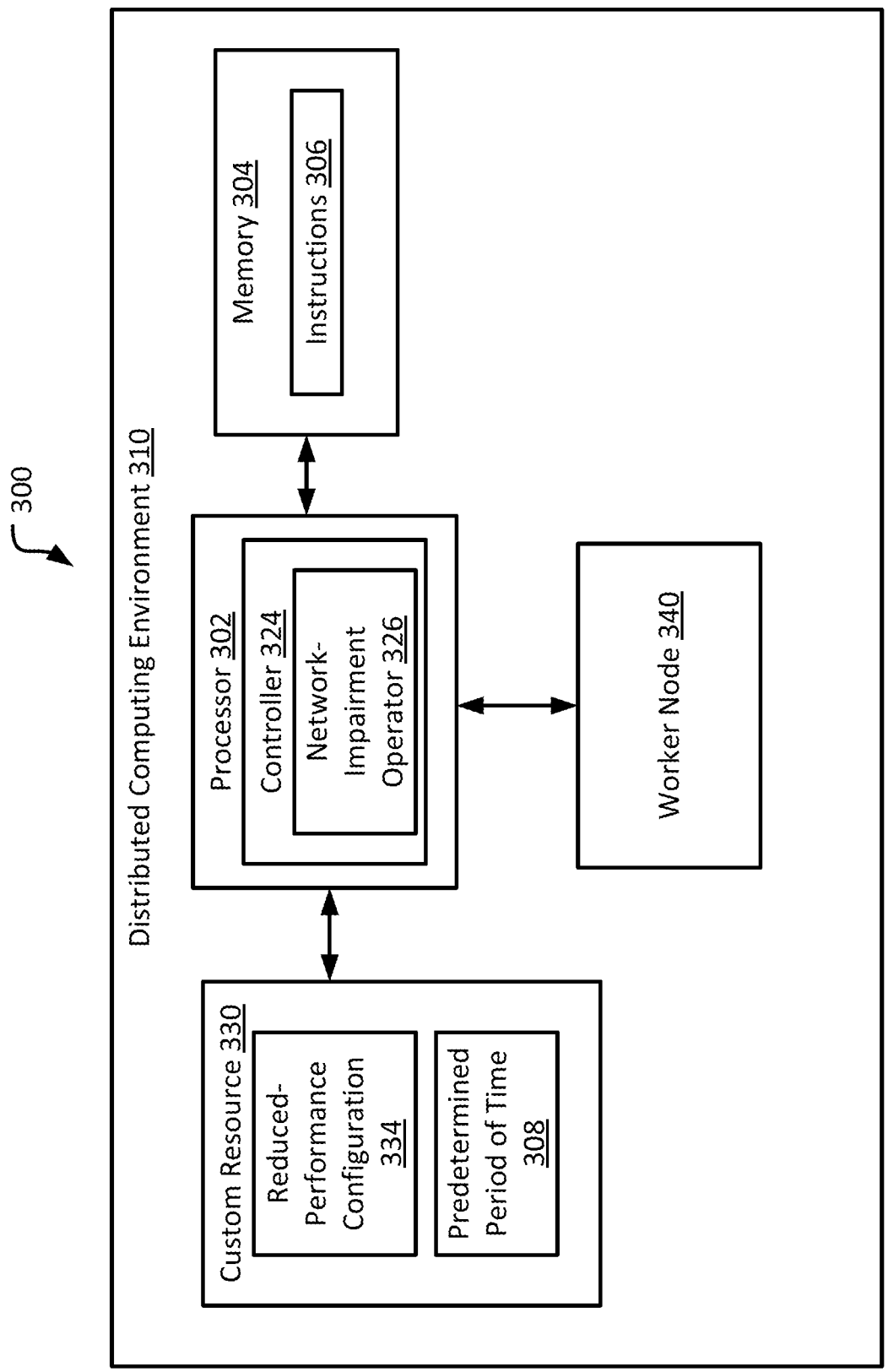
FIG. 3 shows a block diagram of another example of a system for applying impairments to nodes of a distributed computing environment according to some aspects of the present disclosure.

FIG. 3 shows a block diagram of another example of a system 300 for applying impairments to nodes of a distributed computing environment 310 according to some aspects of the present disclosure. The system 300 includes a processor 302 communicatively coupled with a memory device 304. The processor 302 may be part of a node that executes the controller 124 in FIG. 1. The processor 302 can include one processing device or multiple processing devices. Non-limiting examples of the processor 302 include a Field-Programmable Gate Array (FPGA), an application-specific integrated circuit (ASIC), a microprocessor, etc. The processor 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

The processor 302 can execute the instructions 306 to perform operations. For example, the processor 302 can receive, by a controller 324 of the distributed computing environment 310 executing a network-impairment operator 326, a custom resource 330 defining a reduced-performance configuration 334 for a worker node 340 of the distributed computing environment 310. The reduced-performance configuration 334 can include a network latency specification, a packet loss specification, a link flapping specification, a bandwidth specification, a packet duplication specification, a packet reordering specification, or a combination thereof for the worker node 340. The processor 302 can deploy the reduced-performance configuration 334 to the worker node 340 for a predetermined period of time 308. The predetermined period of time 308 can be specified by the custom resource 330. The controller 324 can generate a daemonset for generating a pod with the reduced-performance configuration 334 on the worker node 340. While the worker node 340 is subjected to the reduced-performance configuration 334, the controller 324 can evaluate a performance of the worker node 340. Subsequent to the predetermined period of time 308 passing, the processor 302 can remove the reduced-performance configuration 334 from the worker node 340. The daemonset can automatically remove the pod with the reduced-performance configuration 334 from the worker node 340 once the predetermined period of time 308 passes. As a result, a user can generate a custom resource, and the custom resource can automatically be used by a network-impairment operator to apply impairments to nodes of a distributed computing environment without the user manually configuring the worker node and other worker nodes the user wants to test.

Figure 4:
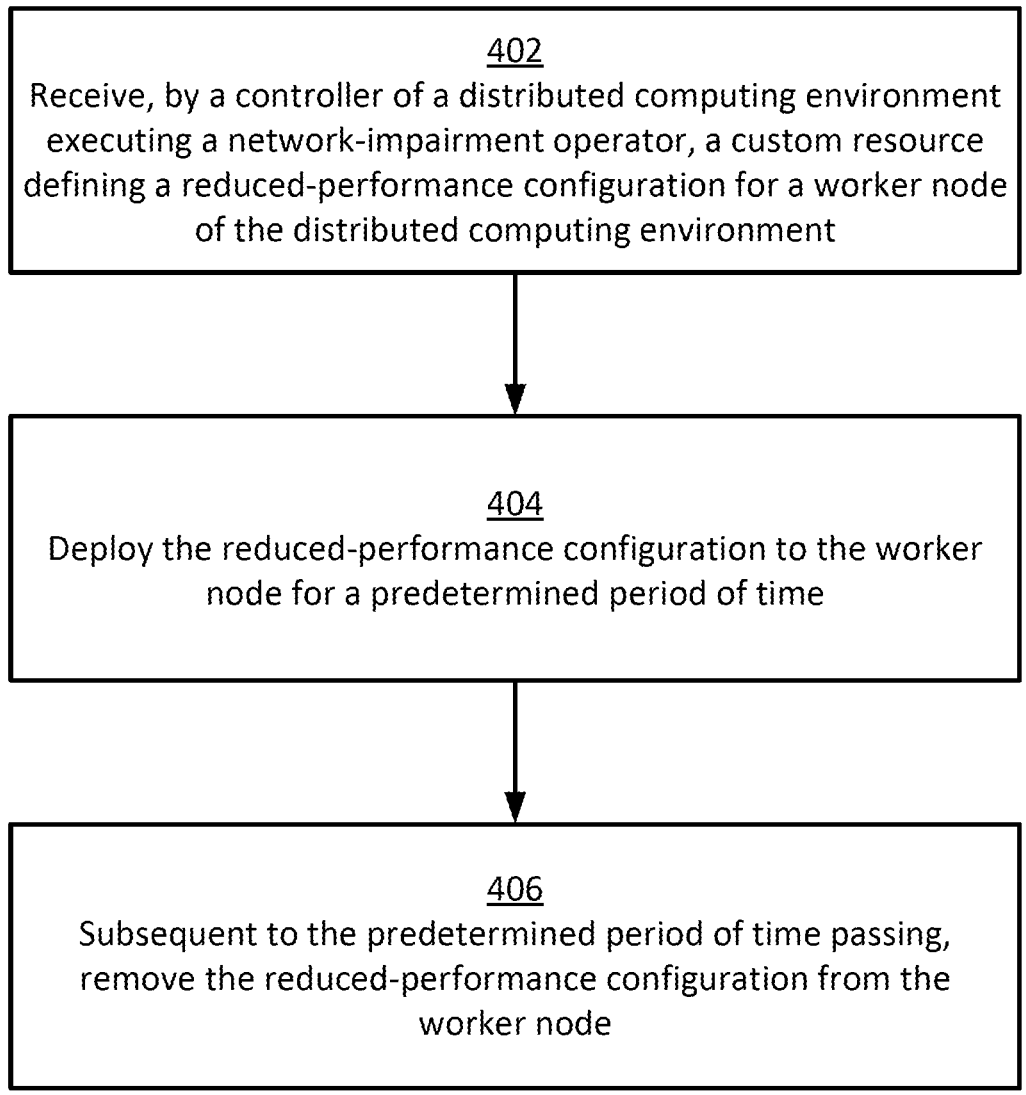
FIG. 4 shows a flow chart of an example of a process for applying impairments to nodes of a distributed computing environment according to some aspects of the present disclosure.

FIG. 4 shows a flow chart of an example of a process for applying impairments to nodes of a distributed computing environment according to some aspects of the present disclosure. In some examples, the processor 302 can implement some or all of the steps shown in FIG. 4. Other examples can include more steps, fewer steps, different steps, or a different combination of steps than are shown in FIG. 4. The steps of FIG. 4 are discussed below with reference to the components discussed above in relation to FIG. 3.

In block 402, the processor 302 receives, by a controller 324 of a distributed computing environment 310 executing a network-impairment operator 326, a custom resource 330 defining a reduced-performance configuration 334 for a worker node 340 of the distributed computing environment 310. The custom resource 330 may be a YAML file created by a user that specifies actions the network-impairment operator 326 is to perform. The reduced-performance configuration 334 can specify network latency specifications, bandwidth specifications, a link flapping specification, a packet loss specification, a packet duplication specification, a packet reordering specification, or a combination thereof that are to be applied to the worker node 340. The reduced-performance configuration 334 can also indicate that the worker node 340, and optionally additional worker nodes of the distributed computing environment 310, is to receive the reduced-performance configuration 334. The reduced-performance configuration 334 can mimic placing the worker node 340 over a WAN without physically separating the worker node 340 from the controller 324. As such, the worker node 340 and the controller 124 can be may be located in a common geographic location.

In block 404, the processor 302 deploys the reduced-performance configuration 334 to the worker node 340 for a predetermined period of time 308. The predetermined period of time 308 can be specified in the custom resource 330, either with a start time and an end time for applying the reduced-performance configuration 334 to the worker node 340, or by specifying a duration of time that the reduced-performance configuration 334 is to be applied to the worker node 340. The processor 302 can generate a daemonset that can generate a pod including the reduced-performance configuration 334. The daemonset can create the configuration of the pod for the worker node 340 to apply the reduced-performance configuration 334 to the worker node 340. Egress components of the reduced-performance configuration 334 can be applied by a network interface card of the worker node 340. Alternatively, ingress components of the reduced-performance configuration 334 can be applied by an intermediate function block of the distributed computing environment 310.

In block 406, the processor 302, subsequent to the predetermined period of time 308 passing, removes the reduced-performance configuration 334 from the worker node 340. The processor 302 can configure the daemonset to automatically remove the pod from the worker node 340 subsequent to the predetermined period of time 308 passing.

Removing the reduced-performance configuration 334 can allow the distributed computing environment 310 to recover. Prior to removing the reduced-performance configuration 334, the processor 302 can evaluate a performance of the worker node 340 while subjected to the reduced-performance configuration 334.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
receive, by a controller of a distributed computing environment executing a network-impairment operator, a custom resource defining a reduced-performance configuration for a worker node of the distributed computing environment;
deploy the reduced-performance configuration to the worker node for a predetermined period of time; and
subsequent to the predetermined period of time passing, remove the reduced-performance configuration from the worker node.

2. The system of claim 1, wherein the memory further includes instructions that are executable by the processor for causing the processor to:
deploy the reduced-performance configuration to the worker node and at least one additional worker node of the distributed computing environment,
wherein the controller, the worker node, and the at least one additional worker node are positionable at a common geographic location.

3. The system of claim 2, wherein the distributed computing environment comprises:
the worker node and the at least one additional worker node are configured to receive the reduced-performance configuration, a number of the at least one additional worker node being greater than a threshold; and
a control plane comprising at least one management node and configured to manage the worker node and the at least one additional worker node.

4. The system of claim 1, wherein the memory further includes instructions that are executable by the processor for causing the processor to deploy the reduced-performance configuration to the worker node by:
generating a daemonset configured to generate a pod on the worker node with the reduced-performance configuration for the predetermined period of time.

5. The system of claim 1, wherein the memory further includes instructions that are executable by the processor for causing the processor to:
evaluate a performance of the worker node during the predetermined period of time.

6. The system of claim 1, wherein the reduced-performance configuration comprises an ingress network latency specification and the memory further includes instructions that are executable by the processor for causing the processor to:
generate an intermediate functional block;

send ingress traffic to the intermediate functional block; and apply, by the intermediate functional block, the ingress network latency specification to the ingress traffic.

7. The system of claim 1, wherein the reduced-performance configuration comprises a network latency specification, a packet loss specification, a link flapping specification, a bandwidth specification, a packet duplication specification, a packet reordering specification, or a combination thereof.

8. A method comprising:
receiving, by a controller of a distributed computing environment executing a network-impairment operator, a custom resource defining a reduced-performance configuration for a worker node of the distributed computing environment;
deploying the reduced-performance configuration to the worker node for a predetermined period of time; and
subsequent to the predetermined period of time passing, removing the reduced-performance configuration from the worker node.

9. The method of claim 8, further comprising:
deploying the reduced-performance configuration to the worker node and at least one additional worker node of the distributed computing environment,
wherein the controller, the worker node, and the at least one additional worker node are positionable at a common geographic location.

10. The method of claim 9, wherein the distributed computing environment comprises:
the worker node and the at least one additional worker node are configured to receive the reduced-performance configuration, a number of the at least one additional worker node being greater than a threshold; and
a control plane comprising at least one management node and configured to manage the worker node and the at least one additional worker node.

11. The method of claim 8, further comprising deploying the reduced-performance configuration to the worker node by:
generating a daemonset configured to generate a pod on the worker node with the reduced-performance configuration for the predetermined period of time.

12. The method of claim 8, further comprising:
evaluating a performance of the worker node during the predetermined period of time.

13. The method of claim 8, wherein the reduced-performance configuration comprises an ingress network latency specification and the method further comprises:
generating an intermediate functional block;
sending ingress traffic to the intermediate functional block; and
applying, by the intermediate functional block, the ingress network latency specification to the ingress traffic.

14. The method of claim 8, wherein the reduced-performance configuration comprises a network latency specification, a packet loss specification, a link flapping specification, a bandwidth specification, a packet duplication specification, a packet reordering specification, or a combination thereof.

15. A non-transitory computer-readable medium comprising program code that is executable by a processor for causing the processor to perform operations including:
receiving, by a controller of a distributed computing environment executing a network-impairment operator, a custom resource defining a reduced-performance configuration for a worker node of the distributed computing environment;
deploying the reduced-performance configuration to the worker node for a predetermined period of time; and
subsequent to the predetermined period of time passing, removing the reduced-performance configuration from the worker node.

16. The non-transitory computer-readable medium of claim 15, further comprising program code that is executable by the processor for causing the processor to:
deploy the reduced-performance configuration to the worker node and at least one additional worker node of the distributed computing environment,
wherein the controller, the worker node, and the at least one additional worker node are positionable at a common geographic location.

17. The non-transitory computer-readable medium of claim 16, wherein the distributed computing environment comprises:
the worker node and the at least one additional worker node are configured to receive the reduced-performance configuration, a number of the at least one additional worker node being greater than a threshold; and
a control plane comprising at least one management node and configured to manage the worker node and the at least one additional worker node.

18. The non-transitory computer-readable medium of claim 15, further comprising program code that is executable by the processor for causing the processor to deploy the reduced-performance configuration to the worker node by:
generating a daemonset configured to generate a pod on the worker node with the reduced-performance configuration for the predetermined period of time.

19. The non-transitory computer-readable medium of claim 15, further comprising program code that is executable by the processor for causing the processor to:
evaluate a performance of the worker node during the predetermined period of time.

20. The non-transitory computer-readable medium of claim 15, wherein the reduced-performance configuration comprises an ingress network latency specification, and further comprising program code that is executable by the processor for causing the processor to:
generate an intermediate functional block;
send ingress traffic to the intermediate functional block; and
apply, by the intermediate functional block, the ingress network latency specification to the ingress traffic.

* * * * *